(12) United States Patent
Houillon et al.

(10) Patent No.: US 9,404,485 B2
(45) Date of Patent: Aug. 2, 2016

(54) DOUBLE HYDRAULIC MACHINE WITH A DISTRIBUTION VALVE AND A DRIVING SYSTEM COMPRISING SUCH A HYDRAULIC MACHINE

(71) Applicant: POCLAIN HYDRAULICS INDUSTRIE, Verberie (FR)

(72) Inventors: Pierre-Louis Houillon, Verberie (FR); Gilles Lemaire, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 375 days.

(21) Appl. No.: 14/178,194

(22) Filed: Feb. 11, 2014

(65) Prior Publication Data
US 2014/0227113 A1    Aug. 14, 2014

(30) Foreign Application Priority Data

Feb. 12, 2013 (FR) ...................... 13 51180

(51) Int. Cl.
| | |
|---|---|
| *F16D 31/02* | (2006.01) |
| *F04B 27/08* | (2006.01) |
| *F04B 1/06* | (2006.01) |
| *F04B 49/00* | (2006.01) |
| *F03C 1/40* | (2006.01) |
| *F03C 1/08* | (2006.01) |
| *F16H 61/448* | (2010.01) |
| *B60K 7/00* | (2006.01) |

(52) U.S. Cl.
CPC ................. *F04B 27/08* (2013.01); *F03C 1/045* (2013.01); *F03C 1/0678* (2013.01); *F03C 1/08* (2013.01); *F04B 1/063* (2013.01); *F04B 49/007* (2013.01); *F16H 61/448* (2013.01); *B60K 7/0015* (2013.01); *B60Y 2200/413* (2013.01)

(58) Field of Classification Search
CPC ......... F04B 1/063; F04B 49/007; F03C 1/045
See application file for complete search history.

(56) References Cited

U.S. PATENT DOCUMENTS

| | | | | |
|---|---|---|---|---|
| 5,032,065 | A * | 7/1991 | Yamamuro | F04B 1/063 417/428 |
| 6,269,901 | B1 | 8/2001 | Moffett et al. | |
| 6,318,235 | B1 * | 11/2001 | Allart | F03C 1/045 60/468 |
| 8,448,431 | B2 * | 5/2013 | Heren | F16H 61/448 60/424 |

FOREIGN PATENT DOCUMENTS

| | | |
|---|---|---|
| EP | 0 547 947 A1 | 6/1993 |
| EP | 1 026 025 A1 | 8/2000 |
| FR | 2 719 001 | 10/1995 |

* cited by examiner

*Primary Examiner* — Nathaniel Wiehe
*Assistant Examiner* — Daniel Collins
(74) *Attorney, Agent, or Firm* — Blakely Sokoloff Taylor & Zafman LLP

(57) ABSTRACT

The present invention relates to a double hydraulic machine (100) comprising two elementary machines (M1, M2) each having two orifices, the double hydraulic machine (100) comprising a distribution valve (7) suitable for, in a first configuration (C1), feeding both elementary machines (M1, M2) in parallel, and in a second configuration (C2), producing a short circuit of one of the elementary machines (M2). The invention also relates to a system for driving a vehicle comprising such a hydraulic machine (100) for driving the vehicle into motion.

5 Claims, 4 Drawing Sheets

Figure 1:
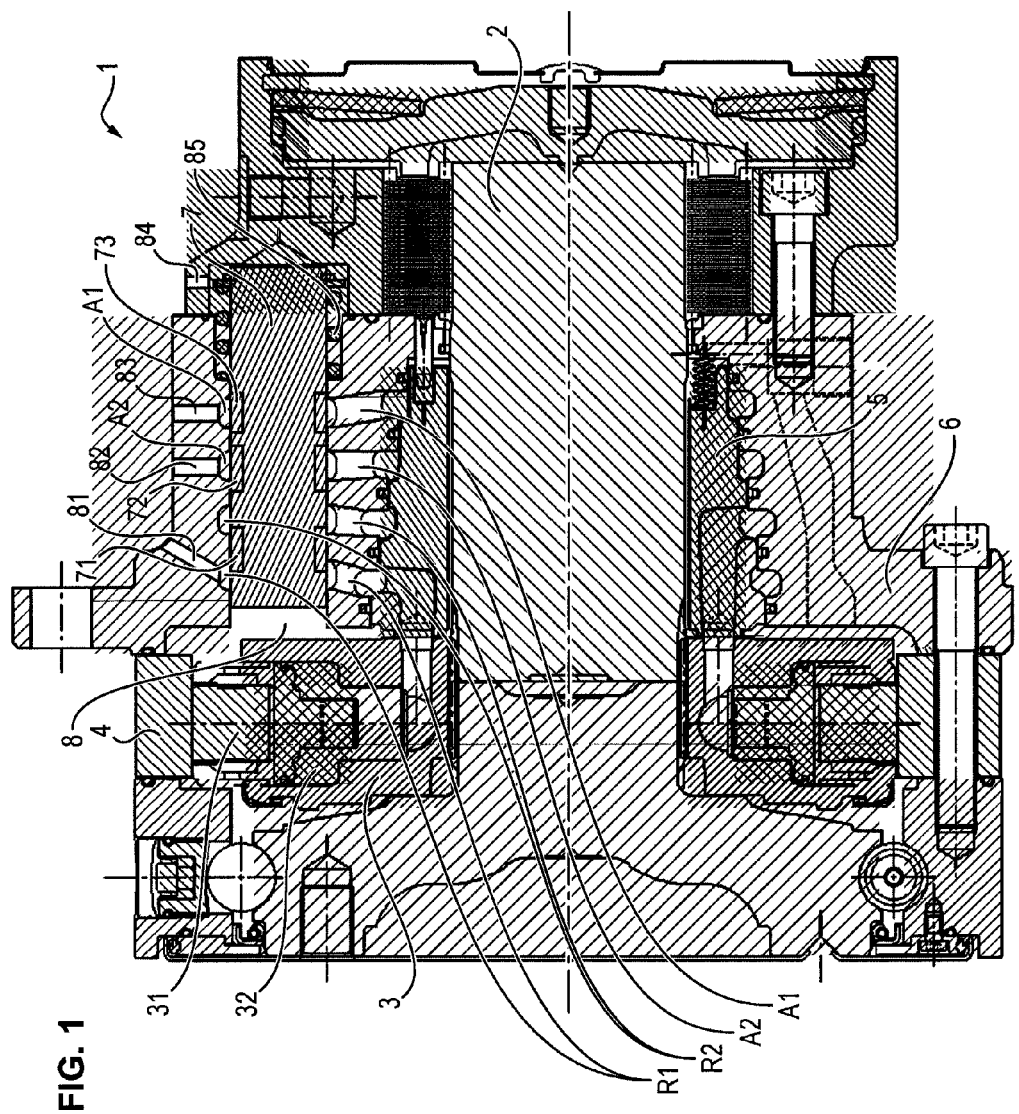

DOUBLE HYDRAULIC MACHINE WITH A DISTRIBUTION VALVE AND A DRIVING SYSTEM COMPRISING SUCH A HYDRAULIC MACHINE

GENERAL TECHNICAL FIELD

The present invention relates to the field of hydraulic machines and systems for driving vehicles by means of such hydraulic machines.

STATE OF THE ART

Hydraulic systems are known which use double hydraulic machines with two operating cylinder capacities, notably giving the possibility of achieving an anti-slip regulatory function on a vehicle by binding two elementary machines of a double hydraulic machine to a common serial line.

Known double hydraulic machines comprise a set of pistons divided into two subsets thus forming two elementary hydraulic machines, both of these elementary hydraulic machines having a first common orifice (admission or discharge depending on the operating direction), and a second distinct orifice (discharge or admission respectively according to the operation direction).

Such systems are marketed by the applicant under the registered trade mark TwinLock.

These systems notably give the possibility of obtaining two distinct speeds by modifying the cylinder capacity of the double hydraulic machines, by short-circuiting one of the elementary machines.

In the case of three-wheel vehicles, such systems do not however give the possibility of obtaining these two distinct speeds both in forward travel and in backward travel of the vehicle without resulting in a blocking of the hydraulic machines.

It is noted that in the whole of the present text, by hydraulic machine will be designated a machine which will operate as a motor or a hydraulic pump. A hydraulic machine conventionally comprises a plurality of pistons positioned in housings, and performing reciprocal movements in contact with a multi-lobe cam. Generally, a hydraulic motor is reversible, and may also operate as a pump if an input torque is applied to it. Conversely, a pump may operate as a motor if pressure is applied at its admission inlet. The designations of motor or pump in the present text thus designate a particular operating mode of the different hydraulic machines, which remain reversible if they are positioned in a suitable system.

PRESENTATION OF THE INVENTION

The present invention is directed to proposing a hydraulic machine which may address this issue, as well as to the driving system applying such a hydraulic machine.

For this purpose, the present invention proposes a double hydraulic machine with two operating cylinder capacities, comprising a case, a distributor, a cylinder block provided with a plurality of pistons positioned facing a cam, said plurality of pistons forming two disconnected subsets thereby defining a first and a second elementary hydraulic machine selectively fed through the distributor each having a first orifice and a second orifice made in the distributor, the double hydraulic machine having three orifices suitable for being connected to the first orifice and to the second orifice of the elementary hydraulic machines, characterized in that it further comprises a distribution valve connecting said three orifices of the hydraulic machine to the distributor, said distribution valve may alternate between two configurations and is configured so as to, in a first configuration, connect the second orifice of the first elementary machine and of the second elementary machine to a first orifice of the double hydraulic machine, and to connect the first orifice of the first elementary machine to a third orifice of the double hydraulic machine and the first orifice of the second elementary machine of the double hydraulic machine to a second orifice of the double hydraulic machine, and in a second configuration, connect the second orifice of the first elementary machine to the first orifice of the double hydraulic machine, and to connect the first orifice of the first elementary machine as well as the first and the second orifice of the second elementary machine both to the second orifice and to the third orifice of the double hydraulic machine.

According to a particular embodiment, the distributor, the case and the cam of the hydraulic machine are fixedly mounted in rotation, the cylinder block is rotatably mounted, the distributor comprises a valving and a valving cover, said distribution valve being slideably mounted in said valving cover.

The invention also relates to a system for driving units for moving a vehicle, comprising:

a hydraulic pump having a first orifice and a second orifice, a first double hydraulic motor with two operating cylinder capacities driving into rotation a first unit for moving the vehicle, said first double hydraulic motor comprising two elementary motors each having a first and a second orifice, second and third hydraulic motors each driving a unit for moving the vehicle and each having a first and a second orifice, wherein the first orifice of the hydraulic pump is connected to the first orifice of each of the second and third hydraulic motors, the second orifice of the second hydraulic motor is connected to the first orifice of the first elementary motor of the first hydraulic motor, the second orifice of the third hydraulic motor is connected to the first orifice of the second elementary motor of the first hydraulic motor, characterized in that said system is configured so as to, in a first configuration, connect the second orifice of the first elementary motor and the second orifice of the second elementary motor of the first hydraulic motor to the second orifice of the hydraulic pump, and in a second configuration, connect the second orifice of the first elementary motor of the first hydraulic motor to the second orifice of the pump, and the second orifice of the second elementary motor of the first hydraulic motor to the first orifice of the first elementary motor of the first hydraulic motor and to the first orifice of the second elementary motor of the first hydraulic motor.

According to a particular embodiment, the second motor is a double hydraulic motor with two operating cylinder capacities, comprising two elementary motors each having a first and a second orifice, said second orifices being connected to each other, the second motor further comprising a distributor suitable for, in a first configuration, connecting the first orifice of the first elementary motor and the first orifice of the second elementary motor to the first orifice of the second hydraulic motor, and connecting the second orifice of the first elementary motor and the second orifice of the second elementary motor to the second orifice of the second hydraulic motor; and in a second configuration, connecting the first orifice of the first elementary motor to the first orifice of the second hydraulic motor, and connecting the second orifice of the first elementary motor, the first orifice of the second elementary motor and the second orifice of the second elementary motor to the second orifice of the second hydraulic motor.

According to a particular embodiment, the third motor is a double hydraulic motor with two operating cylinder capacities, comprising two elementary motors each having a first and a second orifice, said second orifices being connected to each other, the third motor further comprising a distributor suitable for, in a first configuration, connecting the first orifice of the first elementary motor and the first orifice of the second elementary motor to the first orifice of the third hydraulic motor, and connecting the second orifice of the first elementary motor and the second orifice of the second elementary motor to the second orifice of the third hydraulic motor; and in a second configuration, connecting the first orifice of the first elementary motor to the first orifice to the third hydraulic motor, and connecting the second orifice of the first elementary motor, the first orifice of the second elementary motor and the second orifice of the second elementary motor to the second orifice of the third hydraulic motor.

PRESENTATION OF THE FIGS.

Figure 2:
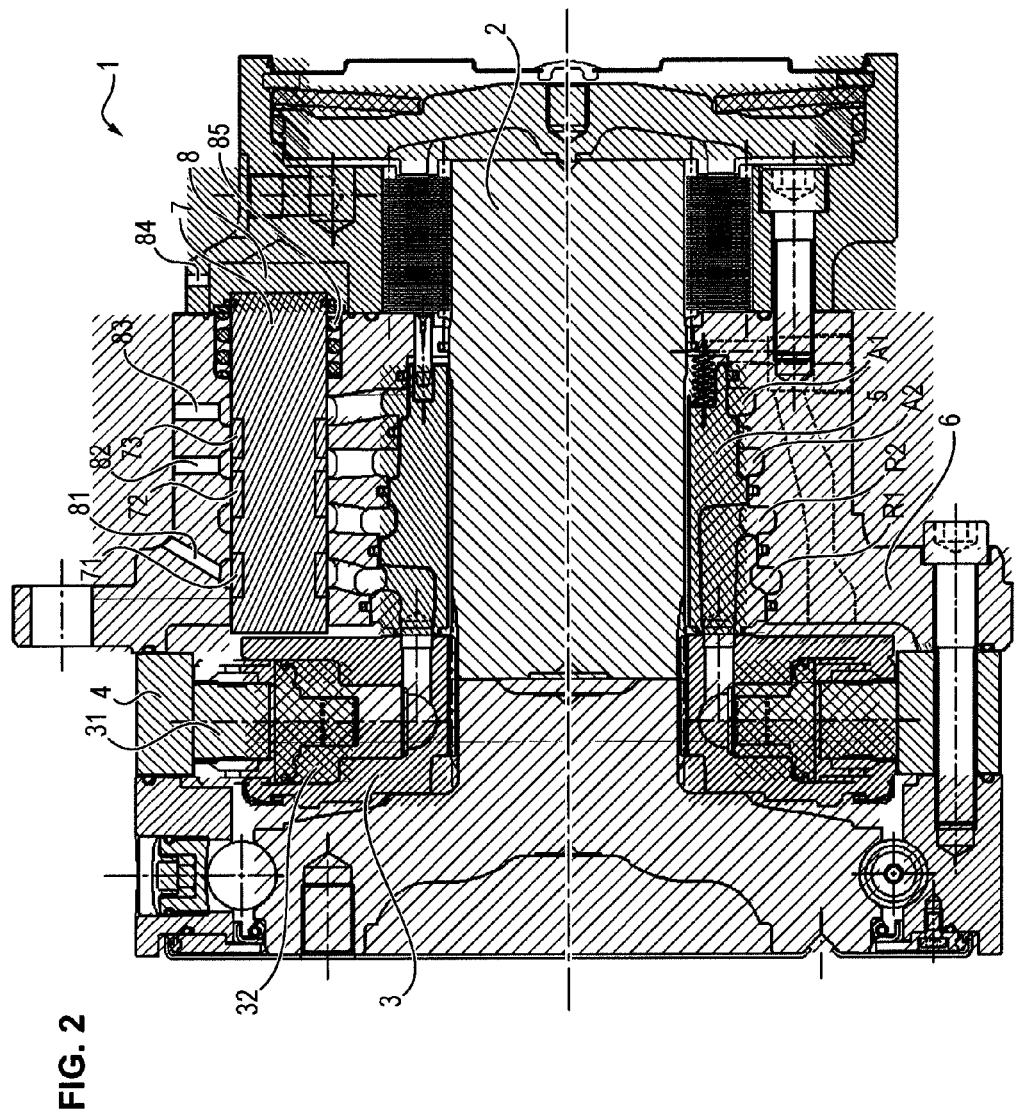
Figure 3:
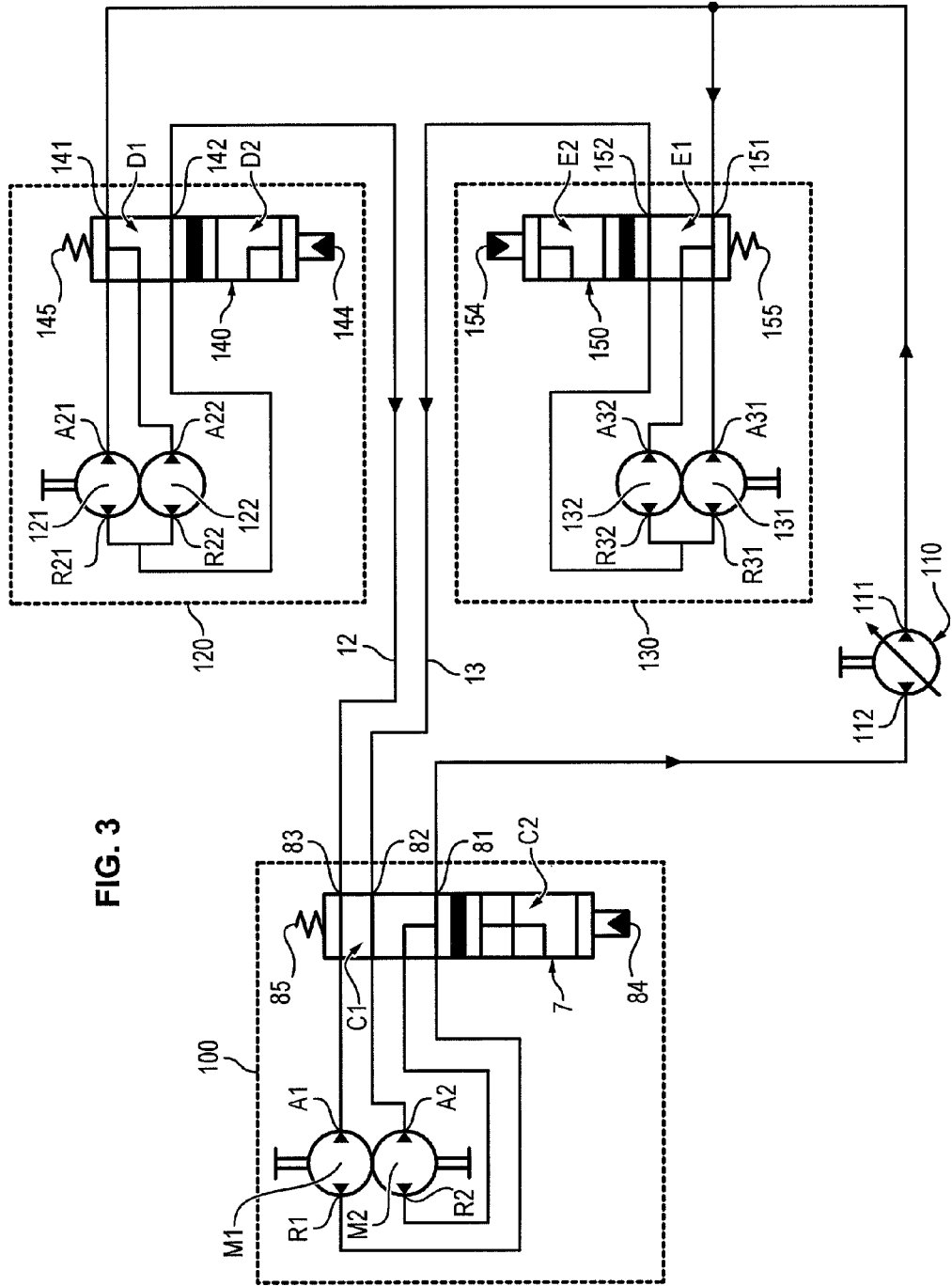
Figure 4:
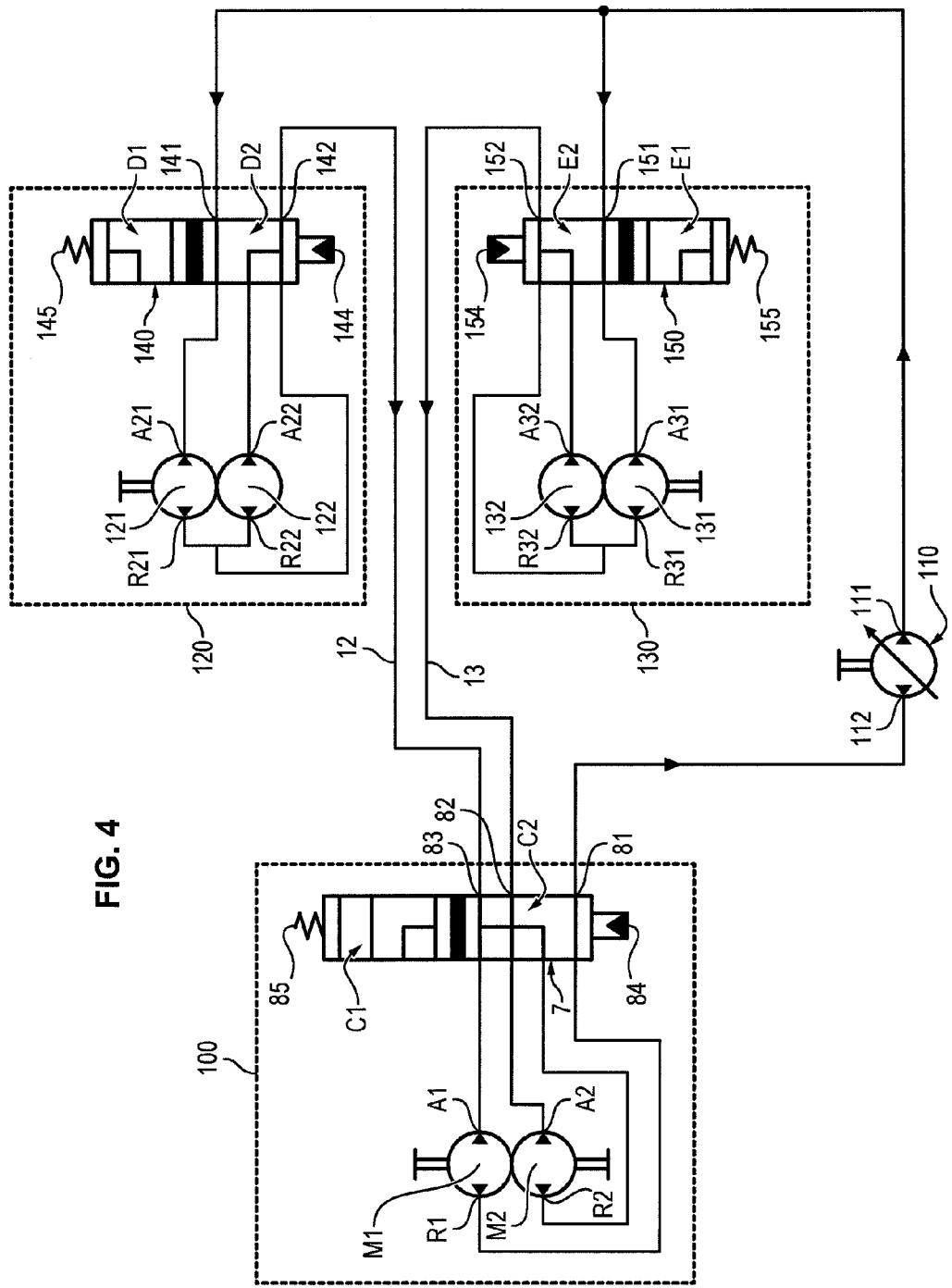

Other features, objects and advantages of the invention will become apparent from the description which follows, which is purely illustrative and non-limiting, and which should be read with reference to the appended drawings, wherein FIGS. 1 and 2 show an example of a hydraulic machine according to one aspect of the invention in two configurations;

FIGS. 3 and 4 show an example of a system for driving a vehicle according to one aspect of the invention in two configurations.

In the whole of the figures, the common elements are located with identical numerical references.

DETAILED DESCRIPTION

FIGS. 1 and 2 show an example of a hydraulic machine 1 according to one aspect of the invention in two configurations;

A hydraulic machine 1 is located on both of these figures, comprising:
a shaft 2,
a cylinder block 3,
a multilobe cam 4,
a distributor comprising a valving 5 and a valving cover 6,
a distribution valve 7.

The hydraulic machine 1 is a double hydraulic machine with two operating cylinder capacities. It comprises a plurality of pistons 31 positioned in housings 32 of the cylinder block facing the cam 4, these pistons 31 forming two disconnected subsets thereby defining first and second elementary hydraulic machines which are respectively designated as M1 and M2, selectively fed by the distributor.

The valving 5 of the distributor thus comprises conduits defining for each of these elementary hydraulic machines M1 and M2, an admission inlet and a discharge outlet corresponding to conduits made in the valving 5 of the distributor.

While considering operation of the hydraulic machine in a given direction, four conduits made in the valving 5 of the distributor are thus located:

A conduit R1 corresponding to the discharge outlet of the elementary machine M1, A conduit R2 corresponding to the discharge outlet of the elementary machine M2, A conduit A2 corresponding to the admission inlet of the elementary machine M2, A conduit A1 corresponding to the admission inlet of the elementary machine M1.

These conduits A1, A2, R1 and R2 are also made in the valving cover 6, and are connected to three orifices opening out from the hydraulic machine 1 which are respectively designated by 81, 82 and 83, which may be connected to a hydraulic circuit for example by means of flexes.

The distribution valve 7 is positioned in the valving cover 6, in a housing 8 into which open the conduits A1, A2, R1 and R2.

The distribution valve 7 is positioned so as to allow the conduits A1, A2, R1 and R2 to be selectively connected to the orifices 81, 82 and 83.

In the illustrated embodiment, the distribution valve comprises three grooves 71, 72 and 73 respectively, made on its periphery, these grooves each allowing one or several conduits A1, A2, R1 and R2 to be connected to one or several orifices 81, 82 and 83.

The distribution valve 7 is slideably mounted in the housing 8, and alternates between two configurations C1 and C2 under application of a pressure screw in a control orifice 84 to which is opposed a spring 85 performing a function of an elastic return means.

The configuration C1 is illustrated in FIG. 1, and the configuration C2 is illustrated in FIG. 2.

In its configuration C1, the distribution valve 7 connects:
The conduits R1 and R2 to the orifice 81 via the groove 71;
The conduit A2 to the orifice 82 via the groove 72,
The conduit A1 to the orifice 83 via the groove 73.

In its configuration C2, the distribution valve 7 connects:
The conduit R1 to the orifice 81 via the groove 71;
The conduits R2, A2 and A1 to the orifices 82 and 83 via the grooves 72 and 73.

Considering a given operating direction of the hydraulic machine 1, the configuration C1 thus gives the possibility of feeding both elementary hydraulic machines M1 and M2 so that they each have a driving operation, the feeding being achieved via the orifices 82 and 83 and the discharging being common via the orifice 81.

In configuration C2, the elementary machine M2 is a free wheel configuration. Indeed, its admission inlet A2 and its discharge outlet R2 are connected to each other, and this elementary machine M2 is therefore with zero cylinder capacity.

The elementary machine M1 as for it always has a driving operation, its admission inlet being connected to the orifices 82 and 83, and its discharge outlet to the orifice 81.

Considering operation of the hydraulic machine 1 in the reverse direction, the feeds and discharge of the elementary machines M1 and M2 are inverted relatively to what was described earlier. Thus, in reverse operation, the orifice 81 is an admission orifice and the orifices 82 and 83 are discharge orifices.

Therefore, in the C1 configuration in reverse operation, both elementary machines M1 and M2 are fed through the orifice 81, via the conduits R1 and R2, respectively, which form their admission inlet.

The conduits A1 and A2 respectively form the discharge outlet of the elementary machine M1 and of the elementary machine M2.

Therefore one has two elementary machines M1 and M2 fed through a common admission inlet, and having two distinct discharge outlets.

In configuration C2 in reverse operation, the elementary machine M1 is fed via the orifice 81 connected to the conduit R1 which forms its admission inlet, while its discharge outlet A1 is connected to the admission inlet R2 and to the discharge outlet A2 of the elementary machine M2, these three conduits A1, A2 and R2 being connected to both orifices 82 and 83.

The elementary machine M2 is therefore with zero cylinder capacity, while the elementary machine M1 has a driving operation.

The hydraulic machine structure shown thus gives the possibility of achieving a cylinder capacity variation by short-circuiting or by achieving what is commonly called a—by-pass—of one of the elementary machines, in either one of the operating directions of the hydraulic machine typically corresponding to driving a vehicle forwards or backwards.

FIGS. 3 and 4 show an example of a vehicle driving system according to one aspect of the invention in two configurations.

The system as shown comprises a hydraulic motor 100 typically identical with the hydraulic machine 100 shown earlier with reference to FIGS. 1 and 2, a hydraulic pump 110, a left-hand motor 120, and a right-hand motor 130.

The hydraulic pump 110 is typically reversible and with variable cylinder capacity, having a discharge outlet 111 and an admission inlet 112.

The various elements making up the hydraulic motor 100 described earlier are located in FIGS. 3 and 4.

The distribution valve 7 may be integrated to the hydraulic motor 100 as described earlier, or be a distinct component.

The left-hand 120 and right-hand 130 motors are double hydraulic motors, each having two operating cylinder capacities according to a double hydraulic motor structure well known to one skilled in the art, comprising an admission inlet and a discharge outlet which are each selectively connected to the admission inlet and to the discharge outlet of two elementary motors forming the double hydraulic motor.

The hydraulic motor 100 as well as the left-hand 120 and right-hand 130 motors are each connected to a distinct drive axis of a vehicle.

The left-hand motor 120 thus comprises two elementary motors 121 and 122, each having an admission inlet and a discharge outlet; the admission inlet and the discharge outlet of the elementary motor 121 are thus designated by A21 and R21 respectively and the admission inlet and the discharge outlet of the elementary motor 122 by A22 and R22.

As illustrated in FIGS. 3 and 4, the discharge outlets R21 and R22 of the elementary motors 121 and 122 are common.

A left-hand distributor 140 is configured so as to connect the admission inlet and the discharge outlet of the elementary motors 121 and 122 to first and second orifices 141 and 142, corresponding to the admission inlet and to the discharge outlet of the left-hand motor 120.

The left-hand distributor 140 is driven by a control 144 to which is opposed a return spring 145, so as to alternate between two configurations:

A first configuration D1 in which the first orifice 141 is connected to admission inlets A21 and A22 of both elementary motors 121 and 122, while the discharge outlets R21 and R22 are connected to the second orifice 142 of the left-hand motor 140.

A second configuration D2 in which the first orifice 141 is connected to the admission inlet A21 of the elementary motor 121, while the discharge outlets R21 and R22 of both elementary motors 121 and 122 as well as the admission inlet A22 of the elementary motor 122 are connected to the second orifice 142 of the left-hand motor 120.

In the same way, the right-hand motor 130 thus comprises two elementary motors 131 and 132, each having an admission inlet and a discharge outlet; the initial inlet and the discharge outlet of the elementary motor 131 are thus designated by A31 and R31 respectively, and the admission inlet and discharge outlet of the elementary motor 132 by A32 and R32.

As illustrated in FIGS. 3 and 4, the discharge outlets R31 and R32 of the elementary motors 131 and 132 are common.

A right-hand distributor 150 is configured so as to connect the admission inlet and the discharge outlet of the elementary motors 131 and 132 to first and second orifices 151 and 152, corresponding to the admission inlet and to the discharge outlet of the right-hand motor 130. The right-hand distributor 150 is driven by a control 154 to which is opposed a return spring 155, so as to alternate between two configurations:

A first configuration E1 in which the first orifice 151 is connected to the admission inlets A31 and A32 of the two elementary motors 131 and 132, while the discharge outlets R31 and R32 are connected to the second orifice 152 of the left-hand motor 150.

A second configuration E2 in which the first orifice 151 is connected to the admission inlet A31 of the elementary motor 131, while the discharge outlets R31 and R32 of the two elementary motors 131 and 132 as well as the admission inlet A32 of the elementary motor 132 are connected to the second orifice 152 of the left-hand motor 130.

The left-hand distributor 140 and the right-hand distributor 150 are typically integrated into the left-hand motor 120 and into the right-hand motor 130, respectively, or are distinct elements of the motors 120 and 130.

From now on, the operation of the thereby illustrated system is described by considering the circulation direction illustrated by the arrows in FIG. 3 which will be described as forward motion.

In a first phase, the configuration shown in FIG. 3, in which the left-hand 140 and right-hand 150 distributors are in their first respective configurations D1 and E1, and in which the distribution valve 7 is in its first configuration C1, is considered.

The pump 110 delivers a fluid flow through its discharge outlet 111, which feeds the left-hand 120 and right-hand 130 motors via their first orifices, 141 and 151, respectively.

The right-hand 140 and left-hand 150 distributors direct the fluid towards the admission inlets of each of the elementary motors of the left-hand 120 and right-hand 130 motors.

The fluid is then discharged by the elementary motors, and via the second orifices 142 and 152 of the left-hand motor 120 and of the right-hand motor 130.

The fluid then passes through a left-hand intermediate line 12 connecting the second orifice 142 of the left-hand motor 120 to the third orifice 83 of the hydraulic motor 100, and through a right-hand intermediate line 13, connecting the second orifice 152 of the right-hand motor 130 to the second orifice 82 of the hydraulic motor 100.

The distribution valve 7 then transports the fluid of the left-hand intermediate line 12 towards the admission inlet A1 of the first elementary machine M1 of the hydraulic motor 100, and the fluid of the right-hand intermediate line 13 towards the admission inlet A2 of the second elementary machine M2 of the hydraulic motor 100.

Both elementary machines M1 and M2 then discharge the fluid through their respective discharge outlets R1 and R2, which are connected to the first orifice 81 of the hydraulic motor 100, itself connected to the admission inlet 112 of the hydraulic pump 110.

In this way an operation is obtained, similar to the system known under the registered trademark TwinLock, giving the possibility of producing an anti-slip regulatory function by connecting through serial lines, in this case the intermediate lines 12 and 13, elementary motors of different axes for driving a vehicle. The motors 100, 120 and 130 are used with maximum cylinder capacity, all the elementary motors making them up being used.

FIG. 4 illustrates the system shown in FIG. 3 in a second configuration, in which the left-hand 140 and right-hand 150 distributors are in their second respective configurations D2 and E2, and in which the distribution valve 7 is in its second configuration C2.

The direction of displacement of the fluid is identical with the one indicated in FIG. 3.

The pump 110 produces fluid through its discharge outlet 111 and feeds the left-hand 120 and right-hand 130 motors through their first orifices, 141 and 151 respectively. A single elementary motor of the right-hand motor 130 and of the left-hand motor 120, 131 and 121 respectively is then operating, the second elementary motors 122 and 132 being with zero cylinder capacity because of the configuration of the distributors 140 and 150 which connects their admission inlet to their discharge outlet. Both motors 120 and 130 thus operate with reduced cylinder capacity.

The left-hand motor 120 and the right-hand motor 130 discharge fluid through their second respective orifices 142 and 152, which is transported through the left-hand 12 and right-hand 13 intermediate lines respectively to the third orifice 83 and to the second orifice 82 of the hydraulic motor 100.

The first elementary machine M1 of the hydraulic motor 100 is thus fed with pressure through the orifices 82 and 83 of the hydraulic motor 100, and discharges fluid through its discharge outlet R1. The second elementary machine M2 of the hydraulic motor 100 as for it is with zero cylinder capacity, its admission inlet A2 and its discharge outlet R2 being at the same pressure because of the configuration C2 in which is the distribution valve 7.

The hydraulic motor 100 then discharges the fluid through its first orifice 81, towards the admission inlet 112 of the pump 110.

This configuration thus allows a reduction in the cylinder capacity of the hydraulic motors 100, 120 and 130 by setting zero cylinder capacity on one of the elementary motors forming each of these motors 100, 120 and 130.

The configuration of the illustrated system implies that the elementary motors M2, 122 and 132 which are set to zero cylinder capacity each have their admission inlet and their discharge outlet connected to a line of the hydraulic circuit which is not directly connected to the discharge outlet of the hydraulic pump 110, which gives the possibility of avoiding blocking of the different motors, 100, 120 and 130 which would occur if the admission inlet and the discharge outlet of an elementary motor were directly connected to the discharge outlet 111 of the hydraulic pump 110 without interposing any hydraulic device.

For a given displacement direction, two displacement speeds of a vehicle equipped with such a system are thus defined, respectively corresponding to the configurations shown in FIGS. 3 and 4.

From now on, reverse operation of the illustrated system is considered which will be designated subsequently as an operation with backward motion.

Reference is again made to FIG. 3 for illustrating this reverse operation.

The pump 110 produces fluid through its orifice 112, which feeds the hydraulic motor 100 via its first orifice 81. The distribution valve 7 connects this first orifice 81 to both elementary machines M1 and M2 which are thus fed, and which then discharge the fluid respectively towards the third orifice 83 for the elementary machine M1 and towards the second orifice 82 for the elementary machine M2.

The fluid is then transported via the intermediate lines 12 and 13 towards the left-hand motor 120 and the right-hand motor 130 respectively, and feeds them via their second orifices, 142, 152 respectively. The fluid entering through these orifices 142 and 152 thus feeds the elementary motors 121, 122, 131 and 132 of the left-hand motor 120 and of the right-hand motor 130, which then discharge the fluid through the first orifices 141 and 151 of the left-hand motor 120 and of the right-hand motor 130 respectively. The fluid is then transported towards the orifice 111 of the pump 110.

In the same way as for the forward motion operation described earlier, a backward motion operation is thus obtained producing an anti-slip regulatory function as earlier, according to a first operating speed in which all the motors 100, 120 and 130 are with full cylinder capacity.

Finally a backward motion operation is considered with the system in the configuration shown in FIG. 4.

The pump 110 produces fluid through its orifice 112, which feeds the hydraulic motor 100 via its first orifice 81. The distribution valve 7 connects this first orifice 81 to the elementary machine M1 in order to feed it, the latter discharging the fluid through both orifices 82 and 83 of the hydraulic motor 100. Both of these orifices 82 and 83 are respectively connected to the left-hand intermediate line 12 and to the right-hand intermediate line 13, as well as to the admission inlet and to the discharge outlet of the elementary machine M2.

The elementary machine M2, as for it, has its admission inlet and its discharge outlet both connected to the orifices 82 and 83 of the hydraulic motor 100. The elementary machine M2 is therefore with zero cylinder capacity.

The fluid is then transported via the intermediate lines 12 and 13 towards the left-hand motor 120 and the right-hand motor 130 respectively, and feeds them via their second orifices, 142 and 152 respectively. The fluid entering through these orifices 142 and 152 thus feeds the elementary motors 121 and 131 of the left-hand motor 120 and of the right-hand motor 130, which then discharge the fluid through the first orifices 141 and 151 of the left-hand motor 120 and of the right-hand motor 130 respectively.

The elementary motors 122 and 132, for their part, are with zero cylinder capacity, their admission inlet and their discharge outlet are each connected to a common orifice and are therefore at the same pressure.

The fluid is then transported towards the orifice 111 of the pump 110.

A second operating backward motion velocity is thus obtained with reduced cylinder capacity for each of the motors 100, 120 and 130.

In the same way as earlier, the configuration of the illustrated system implies that the elementary motors M2, 122 and 132 which are set to zero cylinder capacity each have their admission inlet and their discharge outlet connected to a line of the hydraulic circuit which is not directly connected to the discharge outlet of the hydraulic pump 110, which gives the possibility of avoiding blocking of the different motors 100, 120 and 130 which would occur if the admission inlet and the discharge outlet of an elementary motor were directly connected to the discharge outlet of the hydraulic pump 110 without interposing any hydraulic device therein.

The system as proposed thus gives the possibility of obtaining two operating forward motion speeds, one of both speeds producing an anti-slip regulatory function, and two backward motion operating speeds, one of both speeds producing an anti-slip regulatory function.

The configuration of the system gives the possibility of obtaining these two operating speeds for forward motion and for backward motion while avoiding blocking of all or part of the hydraulic motors as encountered in known systems.

The system thus advantageously utilizes the hydraulic machine structure shown earlier with reference to FIGS. 1 and 2 for producing a system for driving a vehicle.

The system shown is for example applied to a compactor comprising a roller at the front of the vehicle, which is driven by the first motor 100, and two driving wheels at the rear of the vehicle driven by the left-hand motor 120 and the right-hand motor 130.

The compactor thus has a working speed and a road speed in forward motion and also a working speed and a road speed in backward motion.

The invention claimed is:

1. A double hydraulic machine (100) with two operating cylinder capacities, comprising a case, a distributor (5, 6) a cylinder block (3) provided with a plurality of pistons (31) positioned facing a cam (4), said plurality of pistons (31) forming two disconnected sub-assemblies thus defining a first (M1) and a second (M2) elementary hydraulic machine selectively fed by the distributor (5, 6) each having a first orifice (A1, A2) and a second orifice (R1, R2) made in the distributor (5, 6), the double hydraulic machine (100) having three orifices (81, 82, 83) suitable for being connected to the first orifice (A1, A2) and to the second orifice (R1, R2) of the elementary hydraulic machines (M1, M2), characterized in that it further comprises a distribution valve (7) connecting said three orifices (81, 82, 83) of the hydraulic machine (100) to a distributor (5, 6), said distribution valve (7) may alternate between two configurations (C1, C2) and is configured for, in a first configuration, connecting the second orifice of the first elementary machine (M1) and of the second elementary machine (M2) to a first orifice (81) of the double hydraulic machine (100), and connecting the first orifice (A1) of the first elementary machine (M1) to a third orifice (83) of the double hydraulic machine (100) and the first orifice (A2) of the second elementary machine (M2) of the double hydraulic machine (100) to a second orifice (82) of the double hydraulic machine (100), and in a second configuration, connecting the second orifice (R1) of the first elementary machine (M1) to the first orifice (81) of the double hydraulic machine (100), and connecting the first orifice (A1) of the first elementary machine (M1) as well as the first (A2) and the second (R2) orifice of the second elementary machine (M2) both to the second orifice (82) and to the third orifice (83) of the double hydraulic machine (100).

2. The double hydraulic machine (100) according to claim 1, wherein the distributor (5, 6), the case and the cam (4) of the hydraulic machine are fixedly mounted in rotation, the cylinder block (3) is rotatably mounted, the distributor (5, 6) comprises a valving (5) and a valving cover (6), said distribution valve (7) being slideably mounted in said valving cover (6).

3. A system for driving displacement units of a vehicle, comprising:

a hydraulic pump (110) having a first orifice (111) and a second orifice (112), a first double hydraulic motor (100) with two operating cylinder capacities according to one of claim 1 or 2 driving into rotation a first displacement unit of the vehicle, second (120) and third (130) hydraulic motors each driving a displacement unit of the vehicle and each having a first (141, 151) and second (142, 152) orifice, wherein the first orifice (111) of the hydraulic pump (110) is connected to the first orifice (141, 151) of each of the second (120) and third (130) hydraulic motors, the second orifice (142) of the second hydraulic motor (120) is connected to the first orifice (A1) of the first elementary motor (M1) of the first hydraulic motor (100), the second orifice (152) of the third hydraulic motor (130) is connected to the first orifice (A2) of the second elementary motor (M2) of the first hydraulic motor (100), characterized in that said system is configured so as to in a first configuration (C1), connect the second orifice (R1) of the first elementary motor (M1) and the second orifice (R2) of the second elementary motor (M2) of the first hydraulic motor to the second orifice (112) of the hydraulic pump (110), and in a second configuration (C2), connect the second orifice (R1) of the first elementary motor (M1) of the first hydraulic motor (100) to the second orifice (112) of the pump (110) and the second orifice (R2) of the second elementary motor (M2) of the first hydraulic motor (100) to the first orifice (A1) of the first elementary motor (M1) of the first hydraulic motor (100) and to the first orifice (A2) of the second elementary motor (M2) of the first hydraulic motor (100).

4. The system according to claim 3, wherein the second motor (120) is a double hydraulic motor with two operating cylinder capacities, comprising two elementary motors (121, 122) each having a first (A21, A22) and a second orifice (R21, R22), said second orifices (R21, R22) being connected to each other, the second motor (120) further comprising a distributor (140) suitable for, in a first configuration (D1), connecting the first orifice (A21) of the first elementary motor (121) and the first orifice (A22) of the second elementary motor (122) to the first orifice (141) of the second hydraulic motor (120), and connecting the second orifice (R21) of the first elementary motor (121) and the second orifice (R22) of the second elementary motor (122) to the second orifice (142) of the second hydraulic motor (120); and in a second configuration (D2), connecting the first orifice (A21) of the first elementary motor (121) to the first orifice (141) of the second hydraulic motor (120), and connecting the second orifice (R21) of the first elementary motor (121), the first orifice (A22) of the second elementary motor (122) and the second orifice (R22) of the second elementary motor (122) to the second orifice (142) of the second hydraulic motor (120).

5. The system according to one of claim 3 or 4, wherein the third motor (130) is a double hydraulic motor with two operating cylinder capacities, comprising two elementary motors (131, 132) each having a first (A31, A32) and a second orifice (R31, R32), said second orifices (R31, R32), being connected to each other, the third motor (130) further comprising a distributor (150) suitable for, in a first configuration (E1), connecting the first orifice (A31) of the first elementary motor (131) and the first orifice (A32) of the second elementary motor (132) to the first orifice (151) of the third hydraulic motor (130), and connecting the second orifice (R31) of the first elementary motor (131) and the second orifice (R32) of the second elementary motor (132) to the second orifice (152) of the third hydraulic motor (130); and in a second configuration (E2), connecting the first orifice (A31) of the first elementary motor (131) to the first orifice (151) of the third hydraulic motor (130), and connecting the second orifice (R31) of the first elementary motor (131) the first orifice (A32) of the second elementary motor (132) and the second orifice (R32) of the second elementary motor (132) to the second orifice (152) of the third hydraulic motor (130).

* * * * *